United States Patent
Tsotsis

(10) Patent No.: US 11,224,992 B2
(45) Date of Patent: Jan. 18, 2022

(54) HEATING OF THERMOPLASTIC INTERLAYERS IN A PREFORM TOOL FOR PRODUCING A PREFORM OF A COMPOSITE MEMBER

(71) Applicant: The Boeing Company, Chicago, IL (US)

(72) Inventor: Thomas Karl Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 634 days.

(21) Appl. No.: 14/922,902

(22) Filed: Oct. 26, 2015

(65) Prior Publication Data

US 2017/0113421 A1    Apr. 27, 2017

(51) Int. Cl.
| | | |
|---|---|---|
| *B29B 11/16* | (2006.01) | |
| *B29C 35/08* | (2006.01) | |
| *B29C 33/06* | (2006.01) | |
| B29C 70/44 | (2006.01) | |
| B29C 70/48 | (2006.01) | |

(52) U.S. Cl.
CPC .............. *B29B 11/16* (2013.01); *B29C 33/06* (2013.01); *B29C 35/0805* (2013.01); *B29C 70/443* (2013.01); *B29C 70/48* (2013.01); *B29C 2035/0811* (2013.01); *B29C 2035/0816* (2013.01)

(58) Field of Classification Search
CPC ........ B29B 11/16; B29B 15/105; B29B 11/06
See application file for complete search history.

(56) References Cited

U.S. PATENT DOCUMENTS

| | | | | |
|---|---|---|---|---|
| 2,317,597 A | * | 4/1943 | Ford | B29C 33/04 |
| | | | | 249/79 |
| 5,252,165 A | * | 10/1993 | Fecto | B29C 70/222 |
| | | | | 156/228 |
| 5,916,469 A | * | 6/1999 | Scoles | B29C 65/5057 |
| | | | | 219/603 |
| 8,242,688 B2 | | 8/2012 | Kwon et al. | |
| 8,361,262 B2 | | 1/2013 | Tsotsis et al. | |
| 8,372,231 B1 | | 2/2013 | Tsotsis | |
| 8,607,835 B2 | | 12/2013 | Tsotsis | |
| 8,852,713 B2 | | 10/2014 | Tsotsis | |
| 2005/0257887 A1 | * | 11/2005 | Tsotsis | B29B 11/16 |
| | | | | 156/308.2 |
| 2008/0289743 A1 | * | 11/2008 | Tsotsis | B29B 11/16 |
| | | | | 156/93 |

(Continued)

FOREIGN PATENT DOCUMENTS

| | | |
|---|---|---|
| EP | 1473132 A2 | 11/2004 |
| EP | 1473132 B1 | 8/2010 |

*Primary Examiner* — Monica A Huson
*Assistant Examiner* — Kelsey C Grace
(74) *Attorney, Agent, or Firm* — Duft & Bornsen, PC

(57) ABSTRACT

Systems and methods for producing a preform for a composite member. An exemplary method includes preparing a lay-up of reinforcement layers and thermoplastic interlayers, and transferring the lay-up to a preform tool. The method further includes inducing heat in the preform tool to a transition-temperature range that causes the thermoplastic interlayers to become tacky or viscous, and applying pressure to the lay-up with the preform tool to shape the lay-up into the preform.

20 Claims, 8 Drawing Sheets

(56) References Cited

U.S. PATENT DOCUMENTS

2009/0197050 A1* 8/2009 Pridie ............... B29C 70/44
                                                    428/174
2012/0315455 A1* 12/2012 Yamasaki ........... B29B 11/16
                                                    428/221

* cited by examiner

HEATING OF THERMOPLASTIC INTERLAYERS IN A PREFORM TOOL FOR PRODUCING A PREFORM OF A COMPOSITE MEMBER

FIELD

This disclosure relates to the field of manufacturing, and more particularly, to manufacturing of composite materials.

BACKGROUND

Composite materials built of alternating layers of reinforcement fibers are high strength and light weight. Thus, composite materials are commonly used in aerospace industries, automotive industries, and the like. Composite materials are generally prepared by laying up a number of unidirectional reinforcement fabrics into a stack, with the fibers of the fabrics running at different angles. When the reinforcement fabrics are pre-impregnated with a matrix material, it is referred to as "prepreg". The impregnated reinforcement fabrics are laid-up or formed into the shape of the desired composite member, and then heated to cure the matrix material. When the reinforcement fabrics are laid-up dry (i.e., without the matrix material), it is referred to as a "preform". The dry fabrics are formed with a tool (referred to as a preform tool) into a "preform" that has a near-net shape of the desired composite member. The preform is then placed in a mold, infused with the matrix material in a liquid-molding process, and heated to cure the matrix material.

To stabilize the preform, binder layers (e.g., a thermoplastic veil) may be laid-up with the reinforcement layers, and the layers may be heated in an oven. The heated layers are then transported to the preform tool (e.g., press) that shapes the heated layers into a preform. After shaping the preform to a near-net shape, the preform is placed in the mold to be infused with the matrix material. This process relies on heating the layers in an oven, which has associated problems. For instance, because the layers would have to be preheated in the oven and then transferred to the preform tool, the temperature of the oven would have to be high enough to overcome the cooling that comes from transferring the layers to the preform tool, which is cold. But if the temperature of the oven is too high, the binder layers can liquefy and flow. When this occurs, the binder material (e.g., thermoplastic) may pool in some spots, and some spots may be devoid of any material to bind the reinforcement layers together for the preform process. It may also be inconvenient for an operator to place the layers in the oven, remove the layers from the oven, or to transport the layers from the oven to the preform tool.

Because composite materials have a wide variety of uses, manufacturers continue to look for ways to improve composite fabrication.

SUMMARY

Embodiments herein describe heating a lay-up of reinforcement layers and thermoplastic interlayers in a preform tool to soften the thermoplastic interlayers. For example, induction heating may be used to heat the layers with a susceptor embedded in the preform tool. The lay-up of reinforcement layers and thermoplastic interlayers may then be shaped by the preform tool into a preform that has a near-net shape. Because the layers are heated within the preform tool, such as by induction, the layers do not need to be preheated in an oven and transferred to the preform tool. Therefore, an oven is not needed for preforming, which avoids the problems associated with using an oven.

By inducing heat into the layers in the preform tool, the temperature of the layers may be accurately controlled. Therefore, there is less risk of overheating the thermoplastic interlayers. For example, a susceptor in the preform tool may be made from a material that reaches a particular temperature range in the presence of a magnetic field from an induction coil. The type of material used for the susceptor may be selected based on the temperature range it reaches so that the thermoplastic interlayers are not overheated.

One embodiment comprises a method of producing a preform for a composite member. The method includes preparing a lay-up of reinforcement layers and thermoplastic interlayers, and transferring the lay-up to a preform tool. The method includes inducing heat in the preform tool to a transition temperature range that causes the thermoplastic interlayers to become tacky or viscous, and applying pressure to the lay-up with the preform tool to shape the lay-up into the preform.

In another embodiment, the method includes removing the pressure applied by the preform tool, and cooling the preform in the preform tool.

In another embodiment, the preform matches a near-net shape after applying pressure to the lay-up with the preform tool.

In another embodiment, the method includes removing the preform from the preform tool, transferring the preform to a molding tool, infusing the preform in the molding tool with a thermosetting matrix material, and curing the thermosetting matrix material.

In another embodiment, the method includes applying a current to an induction coil that encompasses the preform tool to generate a magnetic field that induces heat in a susceptor in the preform tool to the transition temperature range.

In another embodiment, the method includes removing the current applied to the induction coil after applying the pressure to the lay-up with the preform tool to shape the lay-up into the preform, and cooling the preform in the preform tool.

In another embodiment, a surface area of the susceptor corresponds with a surface area of the lay-up.

In another embodiment, the method includes selecting a material for the susceptor that heats to the transition temperature range in the presence of the magnetic field from the induction coil.

In another embodiment, the method includes alternating the reinforcement layers and the thermoplastic interlayers.

In another embodiment, the method includes stitching the reinforcement layers and the thermoplastic interlayers.

Another embodiment includes a method of producing a preform for a composite member. The method includes preparing a lay-up of reinforcement layers and thermoplastic interlayers, and transferring the lay-up to a preform tool that includes a first die having a die cavity and a second die that complements the first die, where the first die and the second die are fabricated from a non-conductive material. The method includes applying a current to an induction coil that encompasses the preform tool to generate a magnetic field that induces heat in a susceptor in the preform tool to a transition temperature range, where the heat from the susceptor in the transition temperature range causes the thermoplastic interlayers to become tacky or viscous without becoming a liquid that flows. The method includes applying pressure to the lay-up between the first die and the second die to shape the lay-up into the preform based on a shape of the die cavity.

In another embodiment, the method includes removing the current applied to the induction coil, removing the pressure applied between the first die and the second die, and cooling the preform in the preform tool.

Another embodiment includes an automated system that produces a preform for a composite member. The automated system includes a preform tool for shaping a lay-up of reinforcement layers and thermoplastic interlayers into the preform. The preform tool includes a first die having a die cavity, a second die that mates with the first die, and a susceptor embedded in the first die or the second die. The automated system further includes an induction coil that encompasses the preform tool, and a controller that controls a power supply to apply a current to the induction coil to generate a magnetic field that induces heat in the susceptor to a transition temperature range. The heat from the susceptor in the transition temperature range causes the thermoplastic interlayers to become tacky or viscous. The controller also controls the preform tool to apply pressure between the first die and the second die to shape the lay-up into the preform.

In another embodiment, the automated system includes a cooling device that cools the preform in the preform tool.

In another embodiment, the automated system includes a cutting device that cuts the reinforcement layers and the thermoplastic layers to a size, a stacking device that stacks the reinforcement layers and the thermoplastic layers, and/or a stitching device that stitches the reinforcement layers and the thermoplastic layers.

In another embodiment, the automated system includes a conveying device that transfers the lay-up from one of the stacking device and the stitching device to the preform tool.

In another embodiment, the automated system includes a molding tool that infuses the preform with a thermosetting matrix material, and cures the thermosetting matrix material. The automated system also includes a conveying device that transfers the preform from the preform tool to the molding tool.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

The embodiments described below provide for systems and methods of manufacturing composite materials using preforms. As an overview, composite materials are prepared by laying-up a number of composite layers of reinforcement fabrics and interlayers of thermoplastic veils. For example, multiaxial non-crimped fabric may be made from two or more reinforcement layers with a thermoplastic veil disposed between each layer as well as on the outer surfaces to form a "stack". A lay-up of one or more stacks is then shaped in a desired manner into a "preform" using a preform tool so that the preform has a near-net shape for a composite member. In preforming, the layers are dry (i.e., without the matrix material), and are shaped into the preform without infusion of a matrix material. After shaping, the preform is infused with the matrix material by liquid molding, and heated to cure the matrix material. The result of this is a composite member having a desired shape.

Figure 1:
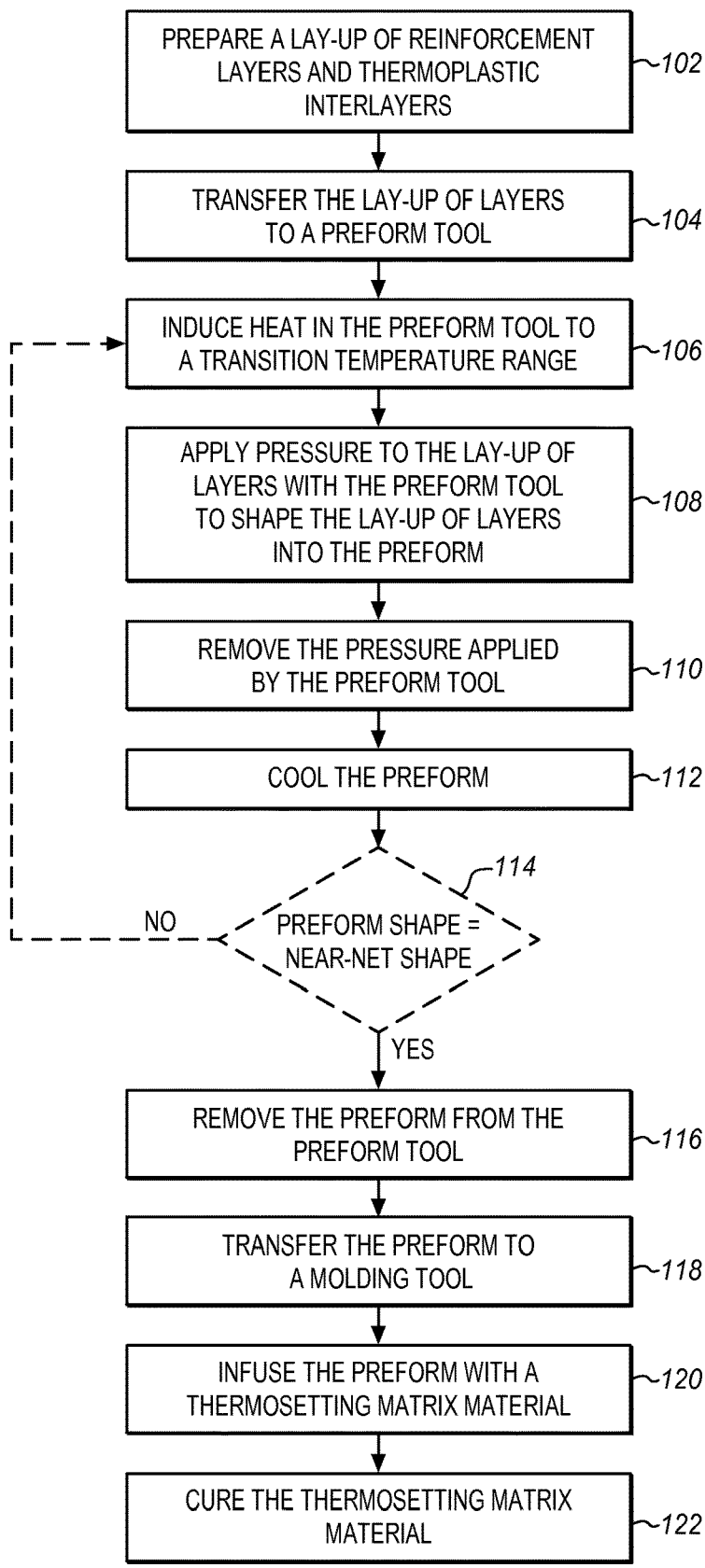
FIG. 1 is a flow chart illustrating a method of forming a composite member in an exemplary embodiment.

FIG. 1 is a flow chart illustrating a method 100 of forming a composite member in an exemplary embodiment. The steps of the methods described herein are not all inclusive and may include other steps not shown. The steps for the flow charts shown herein may also be performed in an alternative order.

Figure 2:
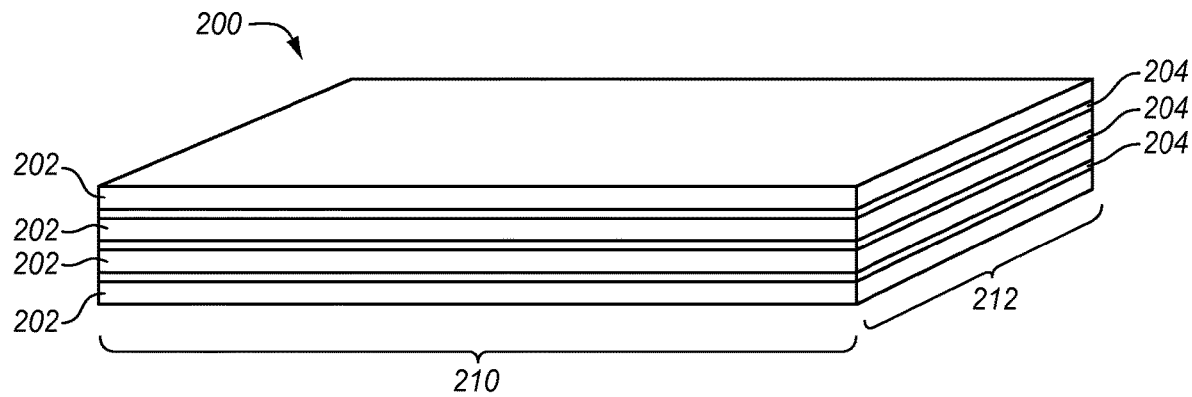
FIG. 2 illustrates a lay-up of reinforcement layers and thermoplastic interlayers in an exemplary embodiment.

Method 100 includes preparing or assembling a lay-up of reinforcement layers and thermoplastic interlayers (step 102). FIG. 2 illustrates a lay-up 200 of reinforcement layers and thermoplastic interlayers in an exemplary embodiment. In the embodiment in FIG. 2, lay-up 200 comprises alternating layers or plies of a reinforcement layer 202 and a thermoplastic interlayer 204. Reinforcement layer 202 is a constituent that provides the strength for the composite, and is comprised of a dry fabric (e.g., unidirectional, woven, braided, non-crimp, etc.). Reinforcement layer 202 may be made from any desired fibers, such as carbon, glass, aluminum, steel, titanium, etc. Thermoplastic interlayer 204 is a constituent that becomes pliable or moldable in a transition temperature range, and solidifies upon cooling below the transition temperature range. Thermoplastic interlayer 204 may be made from any fibers that are compatible with a thermosetting matrix material used to form the composite material, such polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate, and polyester-polyarylate (e.g. Vectran®).

Thermoplastic interlayers 204 may have a woven configuration, or a non-woven configuration, such as a spun-bonded, spunlaced, or mesh fabric of thermoplastic fibers. Although not shown in FIG. 2, thermoplastic interlayers 204 may be melt-bonded or knit-stitched to reinforcement layers 202. Methods of laying-up layers are described in U.S. Pat. Nos. 8,242,688 and 8,852,713, which are incorporated by reference as if fully included herein.

Individual layers of lay-up 200 may be cut by hand or by a computerized machine cutter. The individual layers may be stacked one on top of the other by hand or by a robotic device. Lay-up 200 is transferred to a preform tool (step 104 in FIG. 1). Lay-up 200 may be transferred manually by a human operator, or may be automatically transferred with a robotic device, a conveyor, etc. The preform tool is configured to shape lay-up 200 to produce a preform having a near-net shape. The term "near-net shape" is a manufacturing term that implies that the initial formation of the preform is very close to the final (net) shape of the composite member. The structure of the preform tool may vary based on the desired shape of the preform.

In order to shape lay-up 200 into the preform, heat is induced in the preform tool to the transition temperature range of the thermoplastic interlayers 204 (step 106). The heating of thermoplastic interlayers 204 to the transition temperature range acts to soften the thermoplastic interlayers 204, which makes lay-up 200 more pliable and conducive to forming by the preform tool. The transition temperature range is therefore a range of temperatures where the physical properties of a thermoplastic change so that the thermoplastic softens and becomes viscous or tacky, but does not transform into a liquid that flows. When heated to the transition temperature range, the thermoplastic interlayers 204 become soft and tacky between reinforcement layers 202, but does not liquefy and flow between reinforcement layers 202. The temperature of the preform tool and/or the lay-up 200 may be measured with a temperature sensor to determine when the temperature reaches the transition temperature range.

With lay-up 200 heated to the transition temperature range, the preform tool applies pressure to lay-up 200 to shape the lay-up 200 into the preform (step 108). The amount of pressure may vary as desired to create the preform from lay-up 200, and may be monitored with a pressure sensor. By applying pressure, lay-up 200 is shaped to the contour(s) of the preform tool. For example, the preform tool may comprise a forming or forging die with a die cavity, and the preform tool may apply pressure to lay-up 200 so that the layers 202 and 204 take the shape of the die cavity. The preform tool may then remove the pressure applied by the preform tool (step 110), and cool the preform while in the preform tool (step 112). The step of cooling the preform may comprise allowing the preform to air-cool, or forcing air (ambient or cooled) onto the preform to assist in cooling, such as with one or more fans.

At this point, a determination may be made as to whether the preform has a near-net shape as desired (step 114). For instance, an operator may visually inspect the preform, an imaging or laser device may inspect the preform, or some other device may be used to determine whether the shape of the preform constitutes a near-net shape. If not, steps 106-112 may be performed one or more times until the preform has the desired shape. If the preform does have a desired shape, then the preform may be removed from the preform tool (step 116). The preform may be transferred to a molding tool for liquid molding (step 118), such as Resin Transfer Molding (RTM), or Vacuum-Assisted Resin Transfer Molding (VARTM). While in the molding tool, a thermosetting matrix material (i.e., a thermosetting resin) may be infused into the preform (step 120). The preform may then be heated in the molding tool to cure the matrix material (step 122). During heating, the matrix material reacts with itself to form crosslinks in the matrix of the composite material. After an initial period of heating, the resin gels and behaves as a solid. After gelling, the temperature may be increased to a final temperature to complete the cure and produce the finished composite member. The composite member may then be removed from the mold, and cut, trimmed, or otherwise fabricated as desired. The composite member may also be inspected for defects, delaminations, etc.

In one embodiment, induction heating may be used to heat lay-up 200 within the preform tool. It is assumed that the preform tool is fabricated, at least in part, from a non-conductive material, such as fiberglass, nylon, etc. For example, if the preform tool includes a pair of dies for forming a preform, the dies are fabricated from a material that is not electrically-conductive. To allow for induction heating, a susceptor is attached or embedded in the preform tool. The susceptor heats in response to a magnetic field, which heats the thermoplastic interlayers 204 to the transition temperature range.

Figure 3:
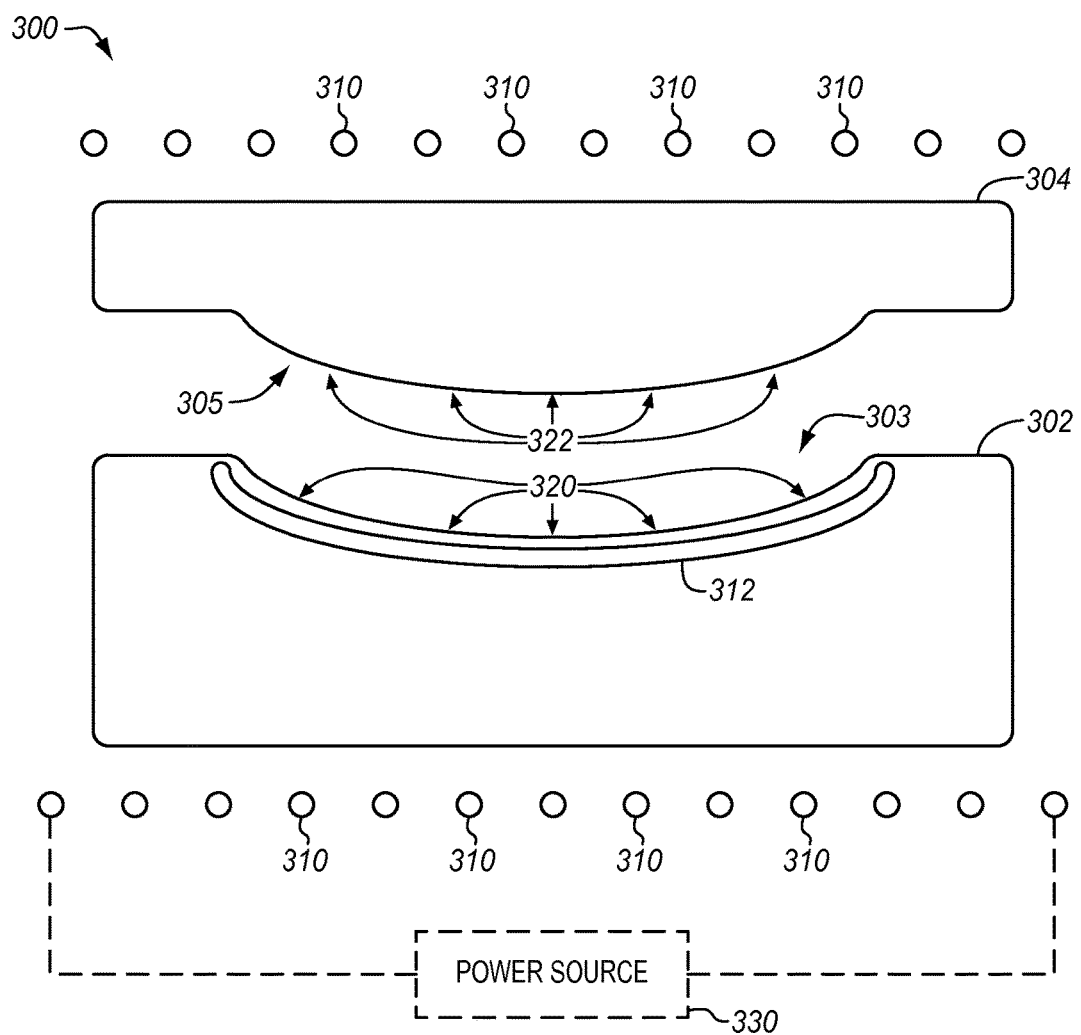
FIG. 3 is a cross-sectional view of a preform tool that uses induction heating in an exemplary embodiment.

FIG. 3 is a cross-sectional view of a preform tool 300 that uses induction heating in an exemplary embodiment. In this embodiment, preform tool 300 is a press having a die 302 that includes a die cavity 303. The surface of die cavity 303 defines a contour 320 that is desired for the preform. Preform tool 300 also includes a complementary die 304 configured to mate with die 302 for producing the preform. Die 304 includes a protruding surface 305 having a contour 322 that corresponds with the contour 320 of die cavity 303. Therefore, when die 304 is pressed against die 302, composite layers placed between die 302 and die 304 is formed to the shape of contours 320 and 322. FIG. 3 shows an exemplary configuration of preform tool 300, as preform tool 300 may have different configurations depending on the desired shape of the preform.

Preform tool 300 is enhanced in this embodiment with induction heating. It is assumed that die 302 and die 304 are fabricated from a material that is non-conductive, and therefore, dies 302 and 304 do not heat up in response to a magnetic field. To accomplish induction heating, preform tool 300 includes a susceptor 312 (or multiple susceptors) that is installed on, attached to, or embedded within die 302. Susceptor 312 comprises a material that is able to absorb electromagnetic energy and convert it to heat. Susceptor 312 may be made from a variety of materials, such as graphite, molybdenum, silicon carbide, stainless steel, niobium, aluminum, or another type of conductive material. The type of material selected for susceptor 312 depends on the target temperature or temperature range for the induction heating. For example, one type of material for susceptor 312 may reach 175-185° C. in response to a magnetic field, while another type of material may reach 200-225° C. in response to the same magnetic field. Therefore, the material used for susceptor 312 is selected based on the transition temperature range of the thermoplastic layer(s) 204. In one embodiment, the material selected for susceptor 312 has a maximum temperature within the transition temperature range of the thermoplastic. Susceptor 312 may be made in the form of a disk, a tube, a layer or sheet of material, or whatever form is desired for an application. Although not shown in FIG. 3, one or more susceptors may additionally or alternatively be installed on, attached to, or embedded in die 304.

Figure 4:
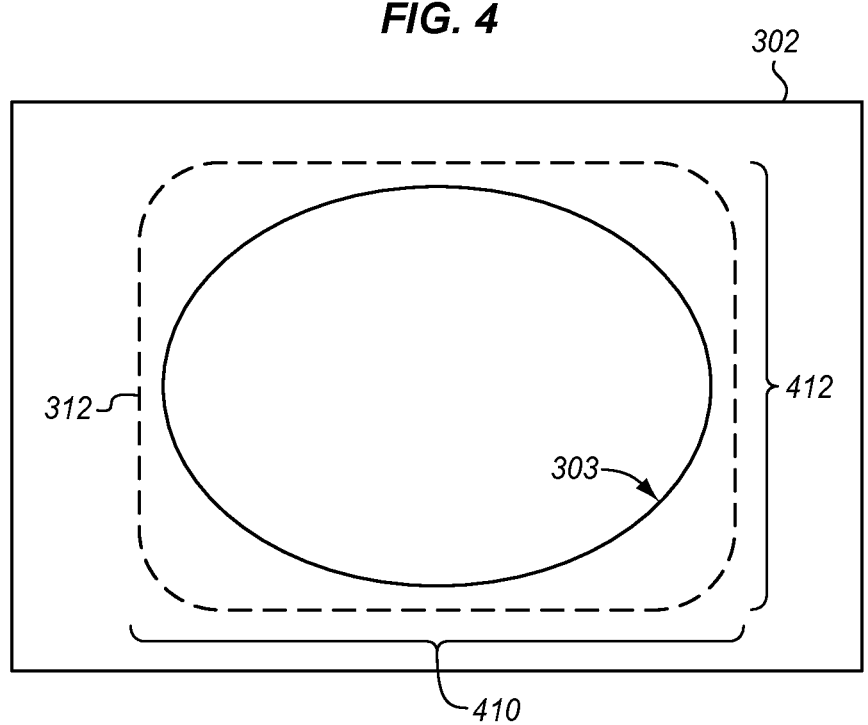
FIG. 4 is a top view of a die for a preform tool in an exemplary embodiment.
Figure 5:
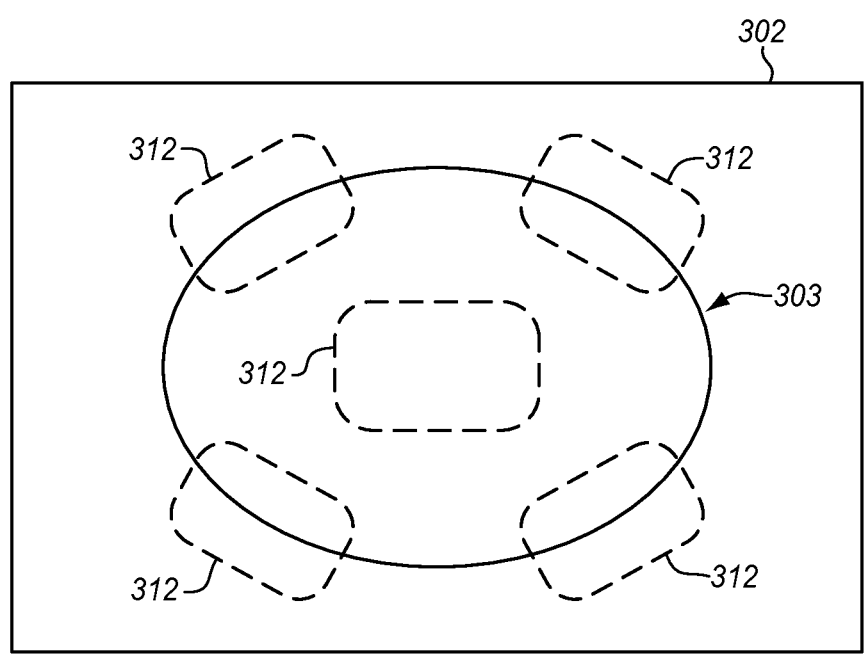
FIG. 5 is a top view of a die for a preform tool in an exemplary embodiment.

An induction coil 310 encompasses preform tool 300, and is configured to conduct current to generate a magnetic field that induces heat in susceptor 312. Because lay-up 200 is non-conductive, susceptor 312 is used to transfer heat to the composite layers of lay-up 200 through conduction or radiation. If it is desirable to apply substantially uniform heat along the length and width of lay-up 200, then the surface area of susceptor 312 may correspond (e.g., be substantially equal) with the surface area of lay-up 200 or the surface area of the portion of lay-up 200 being formed into the preform. FIG. 4 is a top view of die 302 of preform tool 300 in an exemplary embodiment. In this embodiment, susceptor 312 is embedded within die 302 and is a continuous sheet or piece of material. To provide uniform heating of lay-up 200, a length 410 and width 412 may correspond with a length 210 and width 212 of lay-up 200 (see FIG. 2). FIG. 5 is a top view of die 302 of preform tool 300 in another exemplary embodiment. In FIG. 5, multiple susceptors 312 or susceptor segments are embedded within die 302. Susceptors 312 may be placed at locations in die 302 for more localized heating (i.e., where more heat is needed for forming the preform). For example, regions of the preform having smaller features or more complex contours may need more heating. Susceptors 312 may be placed at these locations as desired. In other embodiments, susceptors 312 may be installed on or embedded within die 302, and may be arranged to produce desired heating of lay-up 200. Although the above embodiments described susceptor 312 as being on or within die 302, a susceptor may be additionally or alternatively installed on or within die 304.

In FIG. 3, a power source 330 is connected to opposing ends of induction coil 310. Power source 330 is able to pass an alternating current (AC) through induction coil 310. As the current passes through the windings of induction coil 310, a magnetic field is generated. Susceptor 312 is located within the magnetic field of induction coil 310, and eddy currents are induced in susceptor 312. The eddy currents flow against the electrical resistivity of the material used to form susceptor 312, which generates localized heat within susceptor 312. This is referred to as induction heating, where induction coil 310 is able to induce heat into susceptor 312 without direct contact.

Figure 6:
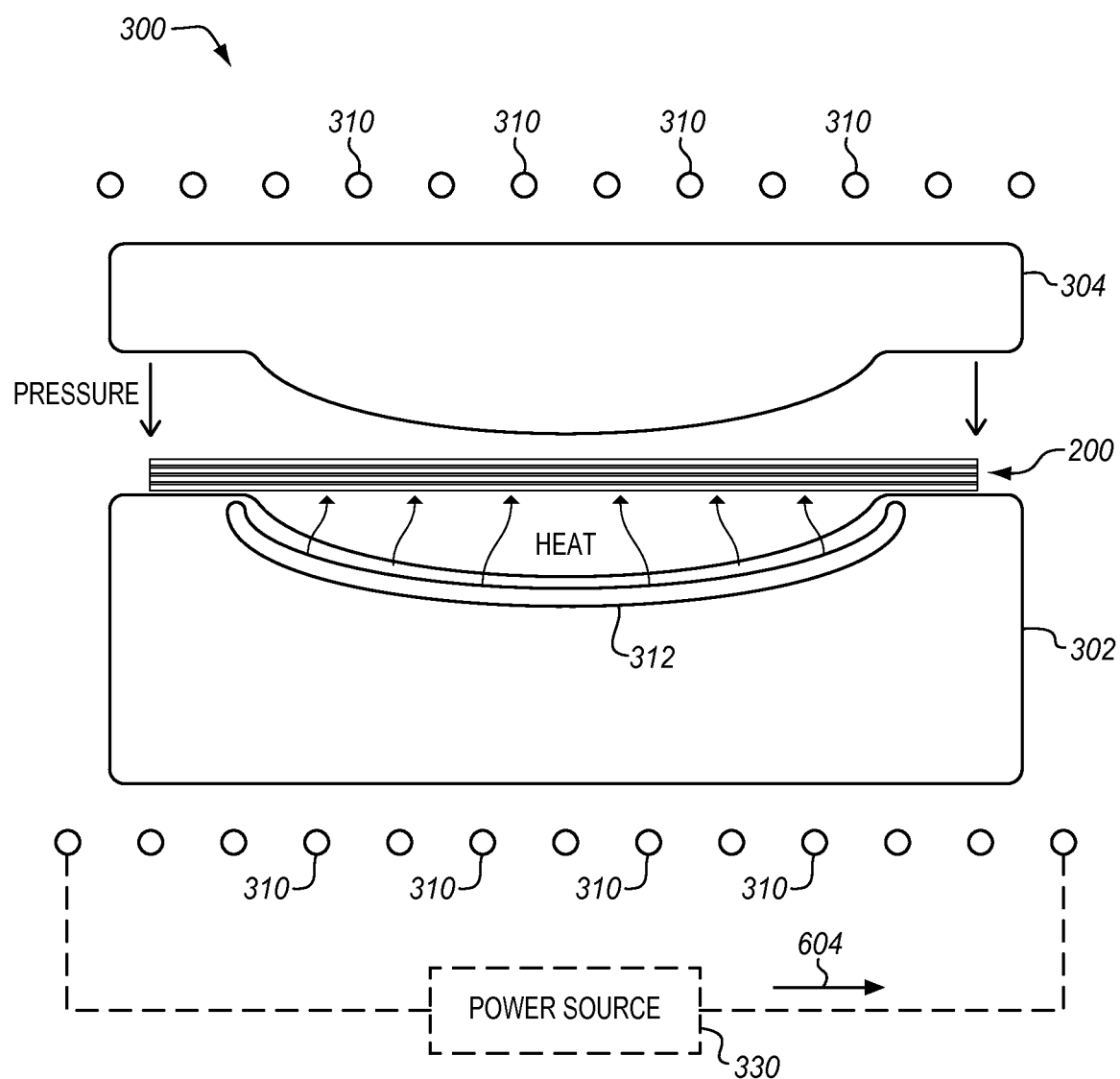
FIGS. 6-8 illustrate a preform tool producing a preform from a lay-up of composite layers in an exemplary embodiment.
Figure 7:
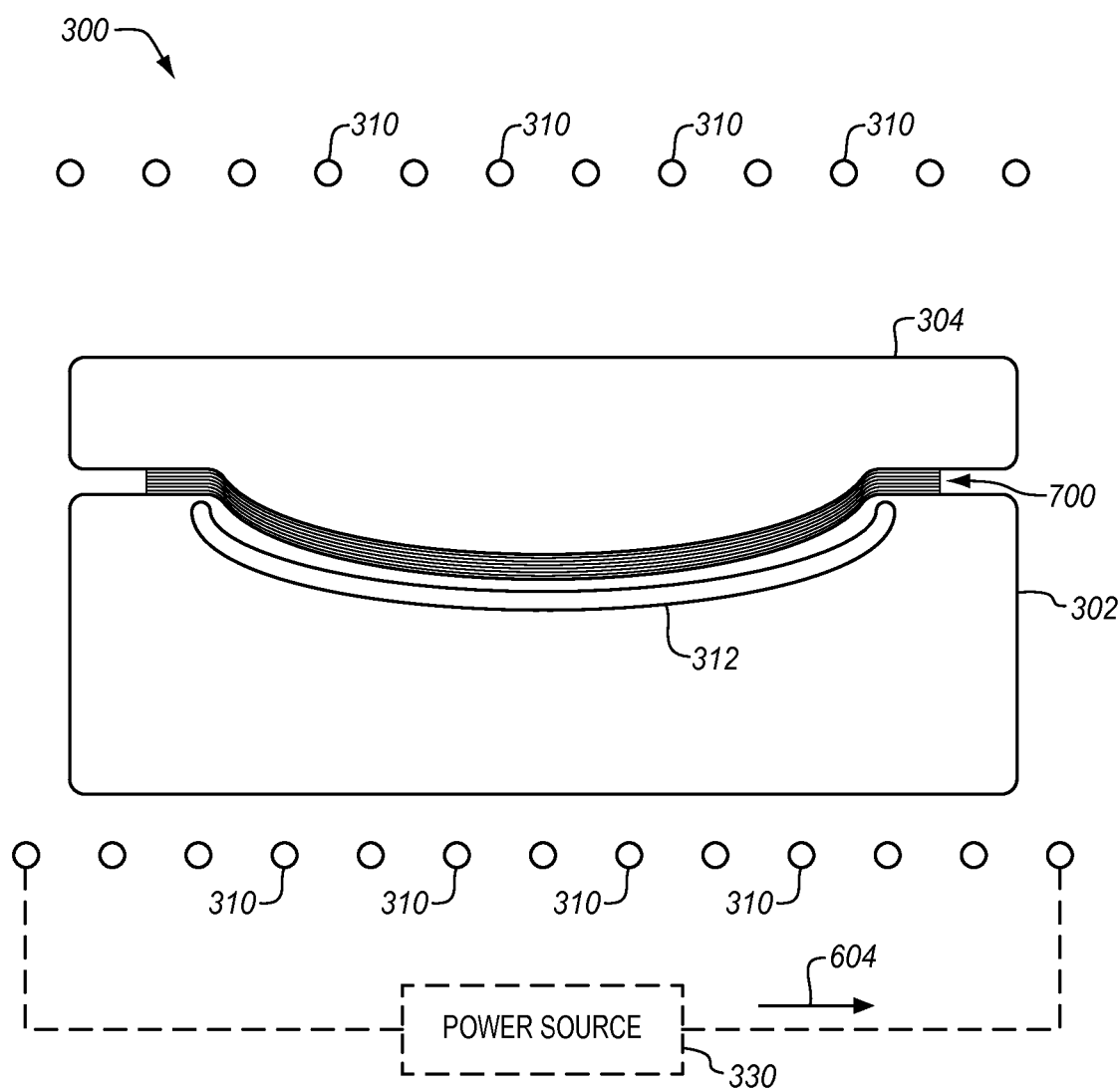
Figure 8:
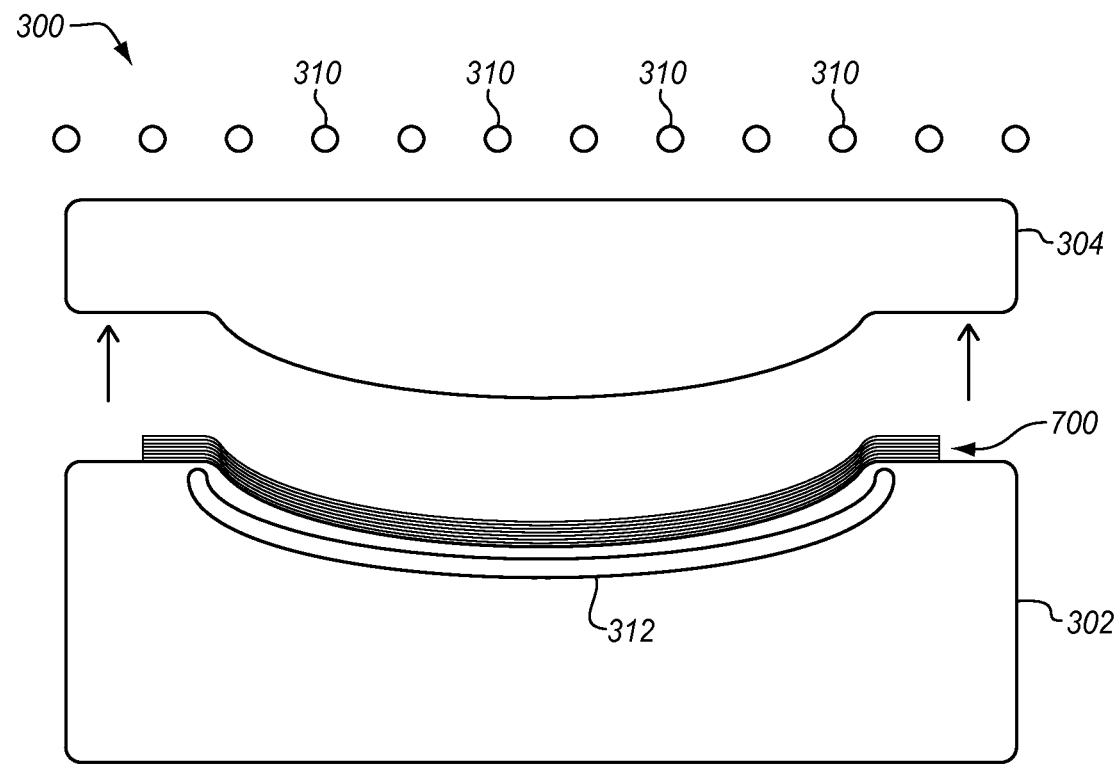
Figure 9:
FIG. 9 illustrates a preform in an exemplary embodiment.

FIGS. 6-8 illustrate preform tool 300 producing a preform from lay-up 200 in an exemplary embodiment. In FIG. 6, lay-up 200 is transferred and loaded onto preform tool 300. As power source 330 applies a current 604 to induction coil 310, susceptor 312 heats up and the heat from susceptor 312 radiates or conducts to the composite layers of lay-up 200. Preform tool 300 applies pressure to lay-up 200, such as by compressing die 304 onto die 302 (see FIG. 7). Due to the heating and pressure, lay-up 200 takes the shape of the contour(s) of preform tool 300, and produces a preform 700. Preform tool 300 removes the pressure applied to preform 700, and power source 330 removes the current through induction coil 310 so that susceptor 312 no longer applies heat to preform 700 (see FIG. 8). Preform 700 may then be removed from preform tool 300, and another lay-up may be loaded onto preform tool 300, such as shown in FIG. 6. FIG. 9 illustrates preform 700 removed from preform tool 300 in an exemplary embodiment. The shape of preform 700 at this point is a near-net shape of the composite member.

Susceptor 312 is able to produce a localized heating within preform tool 300 so that the thermoplastic interlayers 204 reach a desirable state for forming. Susceptor 312 quickly reaches the transition temperature range of thermoplastic interlayers 204 in response to a magnetic field from induction coil 310. Therefore, lay-up 200 does not need to be preheated in an oven before being transported to preform tool 300. Also, the material for susceptor 312 may be selected based on the transition temperature range of thermoplastic interlayers 204. For example, if the transition temperature range of thermoplastic interlayers 204 is 175-185° C., then a material is selected that reaches about 175-185° C. in the presence of the magnetic field from induction coil 310. This allows for very accurate heating of thermoplastic interlayers 204 so that they do not liquefy during heating.

Figure 10:
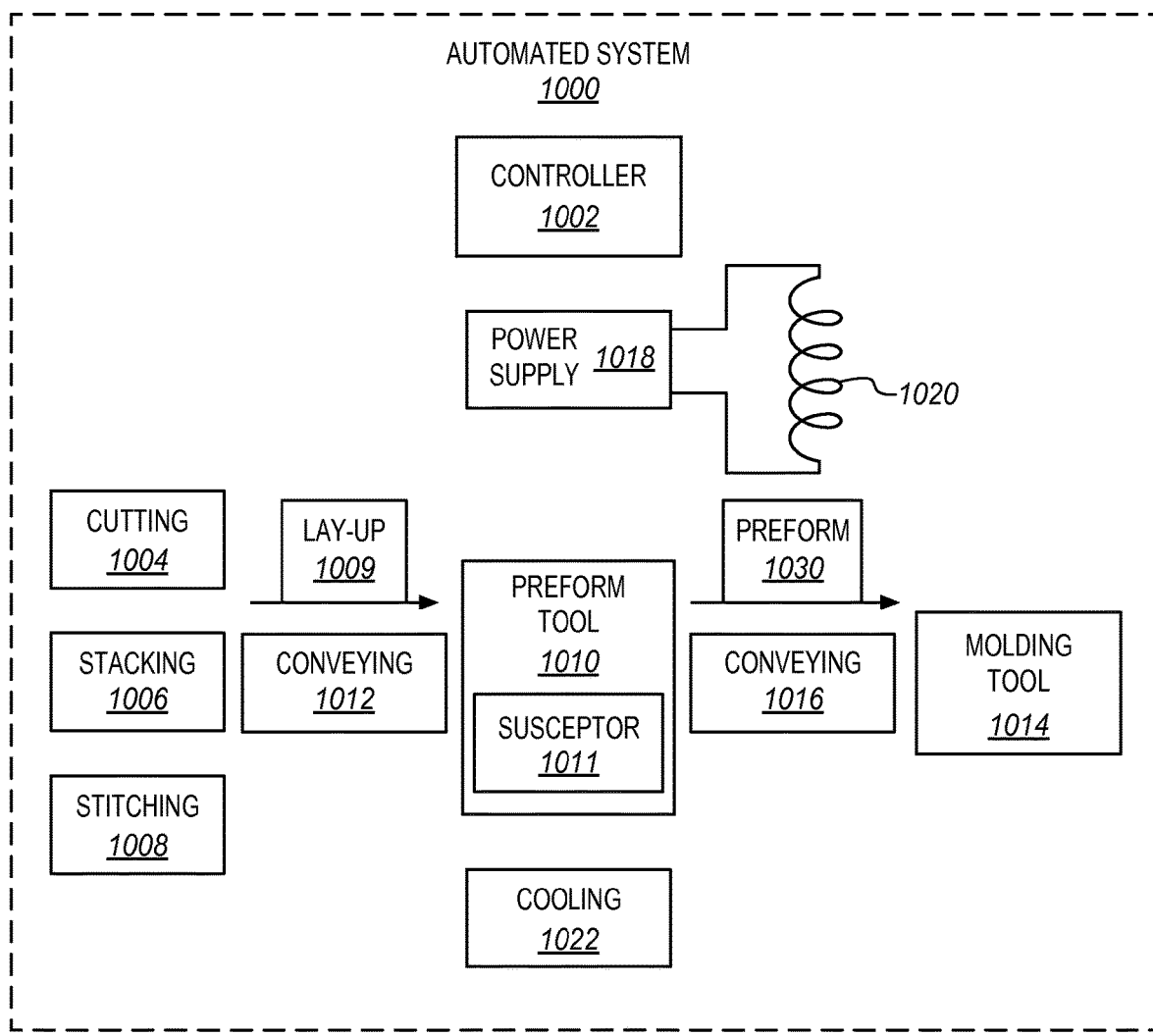
FIG. 10 is a schematic view of an automated system for producing preforms in an exemplary embodiment.

One or more of the processes described above may be automated, and one or more controllers may manage the automated operations. FIG. 10 is a schematic view of an automated system 1000 for producing preforms in an exemplary embodiment. System 1000 includes a controller 1002 that is configured to manage the automated operations. Controller 1002 may comprise hardware (e.g., processor and memory), software, or a combination of hardware and software. Controller 1002 may also include a suitable interface for communicating with automated devices. The communication medium for controller 1002 to these devices may be a wired connection or a wireless connection.

In this embodiment, controller 1002 may be coupled to a cutting device 1004 and a stacking device 1006. Cutting device 1004 is configured to cut reinforcement layers and thermoplastic interlayers to a desired size, and stacking device 1006 is configured to stack the layers in a particular order to create lay-up 1009. Stacking device 1006 may also knit, weave, or otherwise connect the fibers of the layers within lay-up 1009. Controller 1002 may be coupled to a stitching device 1008 that is configured to stitch lay-up 1009 (i.e., stitch the thermoplastic interlayers to the reinforcement layers). Controller 1002 is coupled to a preform tool 1010 (e.g., preform tool 300 shown in FIG. 3) that is configured to produce preforms from a lay-up 1009 of composite layers. Controller 1002 may control any of the operations of preform tool 1010, such as the operations described above for preform tool 300. Controller 1002 may also be coupled to a conveying device 1012 that is configured to transfer lay-up 1009 from stacking device 1006 or stitching device 1008 to preform tool 1010. Controller 1002 may also be coupled to a molding tool 1014 that performs liquid molding, and a conveying device 1016 that is configured to transfer a preform 1030 from preform tool 1010 to molding tool 1014. Although shown as separate tools, a single tool may be used to perform the functions of preform tool 1010 and molding tool 1014.

Controller 1002 may also be coupled to a power supply 1018 for an induction coil 1020. Although not shown in FIG. 10, induction coil 1020 may encompass preform tool 1010 to induce heat in a susceptor 1011 in preform tool 1010. Controller 1002 may instruct power supply 1018 to apply a current to induction coil 1020, or to stop applying a current to induction coil 1020. Controller 1002 may also instruct power supply 1018 as to a magnitude of the current applied to induction coil 1020.

Controller 1002 may also be coupled to a cooling device 1022. Cooling device 1022 is configured to direct air (ambient or cooled) on preform tool 1010 to cool preform 1030 in preform tool 1010. Controller 1002 may turn cooling device 1022 on or off, and may control a temperature of the air directed by cooling device 1022. Controller 1002 may manage the operations of these and/or other devices as part of forming a composite member.

Figure 11:
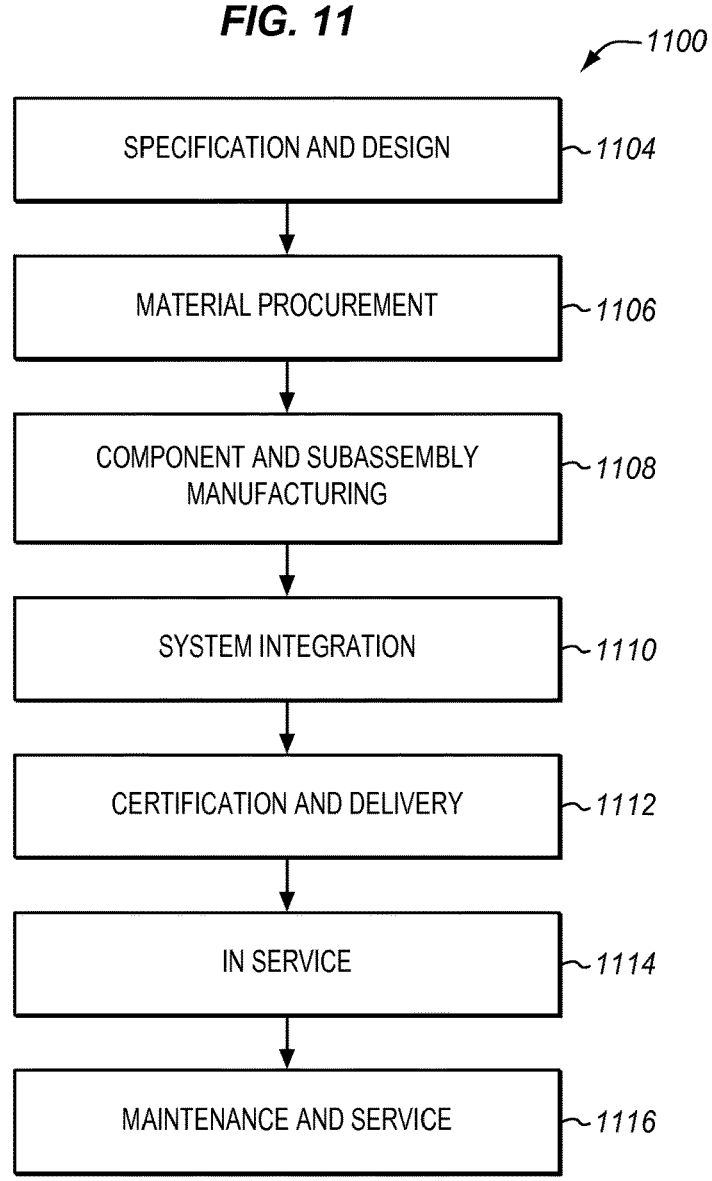
FIG. 11 is a flow chart illustrating an aircraft manufacturing and service method in an exemplary embodiment.
Figure 12:
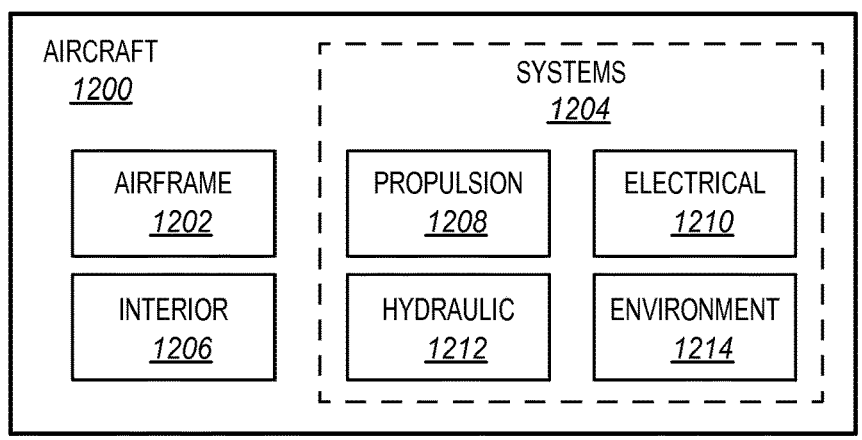
FIG. 12 is a schematic diagram of an aircraft in an exemplary embodiment.

The embodiments of the disclosure may be described in the context of an aircraft manufacturing and service method 1100 as shown in FIG. 11 and an aircraft 1200 as shown in FIG. 12. During pre-production, exemplary method 1100 may include specification and design 1104 of aircraft 1200, and material procurement 1106. During production, component and subassembly manufacturing 1108 and system integration 1110 of aircraft 1200 takes place. Thereafter, aircraft 1200 may go through certification and delivery 1112 in order to be placed in service 1114. While in service by a customer, aircraft 1200 is scheduled for routine maintenance and service 1116 (which may also include modification, reconfiguration, refurbishment, and so on).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, aircraft 1200 produced by exemplary method 1100 may include an airframe 1202 with a plurality of systems 1204 and an interior 1206. Examples of high-level systems 1204 include one or more of a propulsion system 1208, an electrical system 1210, a hydraulic system 1212, and an environmental system 1214. Any number of other systems may be included. Although an aerospace example is shown, the principles described in this specification may be applied to other industries, such as the automotive industry.

Apparatus and methods embodied herein may be employed during any one or more of the stages of the production and service method 1100. For example, components or subassemblies corresponding to production process 1108 may be fabricated or manufactured in a manner similar to components or subassemblies produced while aircraft 1200 is in service. Also, one or more apparatus embodiments, method embodiments, or a combination thereof may be utilized during the production stages 1108 and 1110, for example, by substantially expediting assembly of or reducing the cost of aircraft 1200. Similarly, one or more of apparatus embodiments, method embodiments, or a combination thereof may be utilized while aircraft 1200 is in service, for example and without limitation, to maintenance and service 1116.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A method of producing a preform for a composite member, the method comprising:
preparing a lay-up of dry reinforcement layers and thermoplastic interlayers, wherein the lay-up is non-conductive;
transferring the lay-up to a preform tool;
inducing heat in the preform tool to a transition temperature range that causes the thermoplastic interlayers of the lay-up to become tacky without liquefying and flowing between the dry reinforcement layers; and
shaping the lay-up into the preform by pressing the lay-up between dies of the preform tool with the lay-up heated to the transition temperature range by the preform tool.

2. The method of claim 1 further comprising:
removing pressure applied by the preform tool; and
cooling the preform in the preform tool.

3. The method of claim 2 further comprising:
determining whether a shape of the preform matches a near-net shape for the composite member;
when the shape of the preform does not match the near-net shape, the method further comprises:
inducing heat in the preform tool again to the transition temperature range; and
shaping the lay-up by pressing the lay-up between the dies of the preform tool to further shape the lay-up into the preform.

4. The method of claim 3 wherein:
when the shape of the preform matches the near-net shape, the method further comprises:
removing the preform from the preform tool;
transferring the preform to a molding tool;
infusing the preform in the molding tool with a thermosetting matrix material; and
curing the thermosetting matrix material.

5. The method of claim 1 wherein inducing heat in the preform tool comprises:
applying a current to an induction coil that encompasses the preform tool to generate a magnetic field that induces heat in a susceptor in the preform tool to the transition temperature range.

6. The method of claim 5 further comprising:
removing the current applied to the induction coil after shaping the lay-up into the preform; and
cooling the preform in the preform tool.

7. The method of claim 5 wherein:
a surface area of the susceptor corresponds with a surface area of the lay-up.

8. The method of claim 5 further comprising:
selecting a material for the susceptor that heats to the transition temperature range in the presence of the magnetic field from the induction coil.

9. The method of claim 1 wherein preparing the lay-up comprises:
alternating the dry reinforcement layers and the thermoplastic interlayers.

10. The method of claim 9 further comprising:
stitching the dry reinforcement layers and the thermoplastic interlayers.

11. A method of producing a preform for a composite member, the method comprising:
preparing a lay-up of dry reinforcement layers and thermoplastic interlayers, wherein the lay-up is non-conductive;
transferring the lay-up to a preform tool that includes a first die having a die cavity and a second die that mates with the first die, wherein the first die and the second die are fabricated from a non-conductive material;
applying a current to an induction coil that encompasses the preform tool to generate a magnetic field that induces heat in a susceptor in the preform tool to a transition temperature range, wherein the heat from the susceptor in the transition temperature range causes the thermoplastic interlayers of the lay-up to become tacky without becoming a liquid that flows; and
shaping the lay-up into the preform by pressing the lay-up between the first die and the second die so that the lay-up takes on a shape of the die cavity with the lay-up heated to the transition temperature range by the susceptor.

12. The method of claim 11 further comprising:
removing the current applied to the induction coil;
removing pressure applied between the first die and the second die; and
cooling the preform in the preform tool.

13. The method of claim 12 further comprising:
removing the preform from the preform tool;
transferring the preform to a molding tool;
infusing the preform in the molding tool with a thermosetting matrix material; and
curing the thermosetting matrix material.

14. The method of claim 11 wherein:
a surface area of the susceptor corresponds with a surface area of the lay-up.

15. The method of claim 11 further comprising:
selecting a material for the susceptor that heats to the transition temperature range in the presence of the magnetic field from the induction coil.

16. A method of producing a preform for a composite member, the method comprising:
assembling a lay-up comprised of layers of a dry reinforcement fabric and a thermoplastic veil, wherein the lay-up is non-conductive;
transferring the lay-up to a preform tool; and
shaping the lay-up in the preform tool by:
inducing heat in the preform tool using at least one susceptor embedded in the preform tool, wherein the at least one susceptor is made from a material that reaches a temperature range in the presence of a magnetic field from an induction coil that causes the thermoplastic veil of the lay-up to become tacky without transforming into a liquid;
pressing the lay-up between dies of the preform tool while inducing the heat via the at least one susceptor so that the lay-up takes on a contour of the preform tool to produce the preform;
removing pressure applied by the preform tool;
cooling the preform while in the preform tool;
determining whether a shape of the preform constitutes a near-net shape; and
repeating the shaping in the preform tool when the shape of the preform does not constitute the near-net shape.

17. The method of claim 16 further comprising:
transferring the preform to a molding tool when the shape of the preform constitutes the near-net shape;
infusing a thermosetting resin into the preform at the molding tool; and
curing the thermosetting resin to form the composite member.

18. The method of claim 17 wherein the composite member is formed for an aircraft.

19. The method of claim 16 further comprising:
selecting a type of material for the at least one susceptor based on the temperature range so that the thermoplastic veil is not overheated.

20. The method of claim 16 wherein assembling the lay-up comprises:
alternating the dry reinforcement fabric and the thermoplastic veil.

* * * * *